United States Patent
Takeda

(10) Patent No.: US 9,224,264 B2
(45) Date of Patent: Dec. 29, 2015

(54) MULTIPLE CURRENCY BILL ACCEPTOR

(71) Applicants: Universal Entertainment Corporation, Koto-ku, Tokyo (JP); Aruze Gaming America, Inc., Las Vegas, NV (US)

(72) Inventor: Kengo Takeda, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 0 days.

(21) Appl. No.: 14/361,231

(22) PCT Filed: Nov. 8, 2012

(86) PCT No.: PCT/JP2012/079017
§ 371 (c)(1),
(2) Date: Sep. 30, 2014

(87) PCT Pub. No.: WO2013/080771
PCT Pub. Date: Jun. 6, 2013

(65) Prior Publication Data
US 2015/0034451 A1    Feb. 5, 2015

(30) Foreign Application Priority Data
Nov. 30, 2011    (JP) .................. 2011-262758

(51) Int. Cl.
*G07F 7/04*    (2006.01)
*G07F 17/32*    (2006.01)
(Continued)

(52) U.S. Cl.
CPC ........ *G07F 17/3246* (2013.01); *G06Q 20/0457* (2013.01); *G06Q 20/381* (2013.01)

(58) Field of Classification Search
CPC ........... B65H 2701/1912; G06Q 20/18; G06Q 20/381; G06Q 20/387; G06Q 20/0457; G07F 17/3246; G07F 17/3248
USPC ............... 194/205, 206, 207, 212; 209/534; 235/379; 463/25, 47; 700/231, 232, 700/235, 236, 238
See application file for complete search history.

(56) References Cited

U.S. PATENT DOCUMENTS

| 5,470,079 A | 11/1995 | LeStrange |
| 6,048,269 A | 4/2000 | Burns |

(Continued)

FOREIGN PATENT DOCUMENTS

| JP | 7-505079 | 6/1995 |
| JP | 8-180115 | 7/1996 |

(Continued)

OTHER PUBLICATIONS

Translation of International Search Report for PCT/JP2012/079017, dated Jan. 29, 2013.
(Continued)

*Primary Examiner* — Mark Beauchaine
(74) *Attorney, Agent, or Firm* — KMF Patent Services, PLLC; S. Peter Konzel; Kenneth M. Fagin

(57) ABSTRACT

Provided is a multi-currency bill acceptor that can easily convert an existing cashless system into a multi-currency cashless system at low cost. In the case of reading a ticket, the multi-currency bill acceptor converts information on the ticket into data in a ticket format readable by a game controller and sends it to the game controller; in the case of reading a bill, it sends information on the bill to the game controller in a form of data converted into a ticket format.

8 Claims, 11 Drawing Sheets

(51) Int. Cl.
*G06Q 20/04* (2012.01)
*G06Q 20/38* (2012.01)

(56) References Cited

U.S. PATENT DOCUMENTS

| | | | |
|---|---|---|---|
| 8,597,107 B2 * | 12/2013 | Delaney et al. | 463/25 |
| 2003/0036425 A1 | 2/2003 | Kaminkow | |
| 2005/0096126 A1 | 5/2005 | Prasad | |
| 2005/0282626 A1 | 12/2005 | Manfredi | |
| 2010/0304853 A1 | 12/2010 | Kukita | |
| 2011/0159950 A1 | 6/2011 | Okada | |
| 2012/0115586 A1 | 5/2012 | Okada | |

FOREIGN PATENT DOCUMENTS

| | | |
|---|---|---|
| JP | 2011-5220 | 1/2011 |
| JP | 2011-135922 | 7/2011 |
| JP | 2005-534417 | 11/2014 |
| WO | WO 2010/137184 | 12/2010 |
| WO | WO 2010/137187 | 12/2010 |

OTHER PUBLICATIONS

JP 8-180115 Amendment Aug. 9, 2002.

* cited by examiner

FIG. 11

| 01 | 1 |
|---|---|
| 02 | 2 |
| 03 | 5 |
| 04 | 10 |
| 05 | 20 |
| 06 | 50 |
| 07 | 100 |
| 08 | 200 |
| 09 | 500 |
| 0A | 1,000 |
| 0B | 2,000 |
| 0C | 5,000 |
| 0D | 10,000 |
| 0E | 20,000 |
| 0F | 50,000 |

MULTIPLE CURRENCY BILL ACCEPTOR

TECHNICAL FIELD

The present invention relates to a multi-currency bill acceptor that can handle cash in multiple currencies.

BACKGROUND ART

Some traditional gaming machines issue a barcode ticket at payout, which has achieved a cashless system that pays out cash itself as little as possible. Bill acceptors used in such a cashless system can read both bills in a currency of a single country (such as a currency of the local country) and barcode tickets. However, such bill acceptors cannot read foreign currencies bills. Accordingly, for a facility such as an international casino to be equipped with such traditional bill acceptors, the casino needs to provide a plurality of currency exchange counters or inconveniences the players.

As described above, traditional cashless systems handle a currency of a single country and do not consider currencies of the other countries. At the present day in which cashless systems are commonly used, desired is a multi-currency cashless system that can directly accept foreign currencies, considering convenience to players (such as travelers) having cash in different currencies and increasing opportunities to gain exchange profit by longer playtime and more frequent currency exchanges. In the meanwhile, the traditional cashless systems originally do not support multiple currencies; they cannot be easily converted to a multi-currency cashless system.

CITATION LIST

Patent Literature

Patent Literature 1: US Patent Application Publication No. 2005/0096126
Patent Literature 2: US Patent Application Publication No. 2005/0282626

SUMMARY OF INVENTION

Technical Problem

The present invention has been accomplished in view of the above-described issue and an object of the present invention is to provide a multi-currency bill acceptor that requires easy and low-cost modification for converting an existing cashless system into a cashless system supporting multiple currencies.

Solution to Problem

A feature according to an embodiment of the present invention is a bill acceptor (e.g., the later-described bill acceptor 210) for identifying inserted media including a bill, the bill acceptor comprising a bill acceptor control means including:

a first output control means (e.g., the later-described CPU 211, the ROM 212, and the processing at Step S229 in FIG. 2) for outputting a first type of bill insertion information (e.g., the later described bill insertion information) indicating insertion of a first type of bill in a first currency upon insertion of the first type of bill;

a medium output control means (e.g., the later-described CPU 211, the ROM 212, and the processing at Step S219 in FIG. 2) for outputting credit image data acceptance information (e.g., the later-described barcode acceptance information) including image data-printed medium identification information indicating insertion of an image data-printed medium, on which credit image data obtained by converting credit data representing credit owned by a player into an image is printed, upon insertion of the image data printed medium; and a second output control means (e.g., the later-described CPU 211, the ROM 212, and the processing at Step 241 in FIG. 2) for outputting pseudo credit image data information (e.g., the later described pseudo barcode information) including the image data-printed medium identification information and a second type of bill insertion information indicating insertion of a second type of bill in a second currency different from the first currency upon insertion of the second type of bill.

Provided is a bill acceptor that can handle a second type of bills in a second currency differing from a first currency since the bill acceptor outputs pseudo credit image data information including a second type of bill insertion information indicating insertion of a second type of bill. Since the bill acceptor outputs pseudo credit image data information including image data-printed medium identification information, the game controller can perform the same processing in both cases of insertion of an image data-printed medium and a second type of bill.

Other features according to an embodiment of the present invention are: in addition to the foregoing configuration, that the medium output control means includes authenticity validation information (e.g., the later-described validation code) indicating that the image data-printed medium is authentic and the image data-printed medium identification information (e.g., the later-described information indicating acceptance of a barcode ticket) in the credit image data acceptance information in a case where the image data-printed medium is authentic; and that the second output control means includes foreign currency identification information (e.g., the later-described foreign currency information validation number) for identifying the second currency in the pseudo credit image data information as the second type of bill insertion information.

In both cases of insertion of an image data-printed medium and a second type of bill, the management server can be provided with necessary information.

Still another feature according to an embodiment of the present invention is: in addition to the foregoing configuration, that the second output control means converts an amount of a bill in the second currency using a currency exchange rate for the second currency in a case of insertion of a bill in the second currency.

Even in the case of insertion of a bill in the second currency, the amount can be speedily converted to the amount in the first currency, achieving simple and convenient processing.

Still other features according to an embodiment of the present invention are: in addition to the foregoing configuration, that information output from the bill acceptor control means is input to a game controller (e.g., the later-described game controller 220);

that the game controller outputs first bill acceptance information related to a bill in the first currency in a case of receipt of the first type of bill insertion information;

that the game controller outputs an authenticity check information to check whether the image data-printed medium is authentic in a case of receipt of the credit image data acceptance information or the pseudo credit image data information; and that the bill acceptor outputs the first type of bill insertion information, the credit image data acceptance information, or the pseudo credit image data information to the game controller.

Still other features according to an embodiment of the present invention are: in addition to the foregoing configuration, that a management server (e.g., the later-described ticket/cashless server 10) is connected with the game controller to be able to communicate with each other;

that the management server performs processing related to an amount of the bill in the first currency in a case of receipt of the first bill acceptance information;

that the management server determines whether the image data-printed medium is authentic in a case of receipt of the authenticity check information and insertion of the image data-printed medium, and outputs credit income information indicating that the image data-printed medium is authentic in a case where the image data-printed medium is determined to be authentic;

that the management server outputs the credit information without determining whether the image data-printed medium is authentic in a case of receipt of the authentic check information and insertion of the bill in the second currency; and that the bill acceptor outputs the first type of bill insertion information, the credit image data acceptance information, or the pseudo credit image data information to the management server via the game controller.

Still other features according to an embodiment of the present invention are: in addition to the foregoing configuration, a bill acceptor (e.g., the later-described bill acceptor 210) being capable of reading a ticket (e.g., the later-described barcode ticket) printed in a barcode style and a bill (e.g., the later-described foreign currency bill), that the bill acceptor converts (e.g., the later-described Step S217 in FIG. 2) information on a read ticket to data in a ticket format (e.g., the later-described data format of barcode acceptance information) readable by a game controller (e.g., the later-described game controller 220) and sends (e.g., the later-described Step S219 in FIG. 2) the data to the game controller; and that the bill acceptor sends (e.g., the later-described Step S241 in FIG. 2), in a case of reading a bill, information on the bill in a form of data converted (e.g., the later-described Step S239 in FIG. 2) into the ticket format (e.g., the later-described data format of pseudo barcode information) to the game controller.

Since the bill acceptor sends data converted into a ticket format to the game controller even in the case where a bill is read, the game controller can perform processing assuming that a ticket has been inserted; accordingly, an existing cashless system can be easily converted into a multi-currency cashless system at low cost.

Still other features according to an embodiment of the present invention are: in addition to the foregoing configuration, that the bill acceptor identifies (e.g., the later-described Step S221 in FIG. 2), in a case of reading a bill, whether the bill is a domestic bill (e.g., the later-described domestic currency bill) or a foreign bill (e.g., the later-described foreign currency bill);

that the bill acceptor converts, in a case where the bill is identified as a domestic bill, information on the bill to data in a domestic bill format readable by the game controller (e.g., the later-described Step S227 in FIG. 2) and sends the data to the game controller (e.g., the later-described Step S229 in FIG. 2); and that the bill acceptor converts, in a case where the bill is identified as a foreign bill, information on the bill to data in the ticket format readable by the game controller (e.g., the later-described Step S239 in FIG. 2) and sends the data to the game controller (e.g., the later-described Step S241 in FIG. 2).

Provided is a bill acceptor that can perform processing in both cases of insertion of a domestic bill and a foreign bill.

Still another feature according to an embodiment of the present invention is a control system comprising:

a game controller capable of reading data in a domestic bill format read from a domestic bill and data in a ticket format read from a ticket printed in a barcode style;

a bill acceptor connected with the game controller, for reading a domestic bill and a ticket printed in the barcode style;

a storage device holding conversion data to be used in converting information on a bill other than domestic bills into data in a ticket format readable by the game controller in a case where the bill acceptor reads the bill other than domestic bills; and a conversion control unit.

A control system including a bill acceptor can be provided that can perform processing in all cases of insertion of a domestic bill, a foreign bill, and a ticket.

Advantageous Effects of Invention

The present invention can easily convert an existing cashless system into a cashless system supporting multiple currencies at low cost.

BRIEF DESCRIPTION OF DRAWINGS

FIG. 11 is a drawing illustrating relations between bill types and amounts.

DESCRIPTION OF EMBODIMENTS

Hereinafter, an embodiment is described based on the drawings.

<<<Configuration of Multi-Currency Gaming System 10>>>

Figure 1:
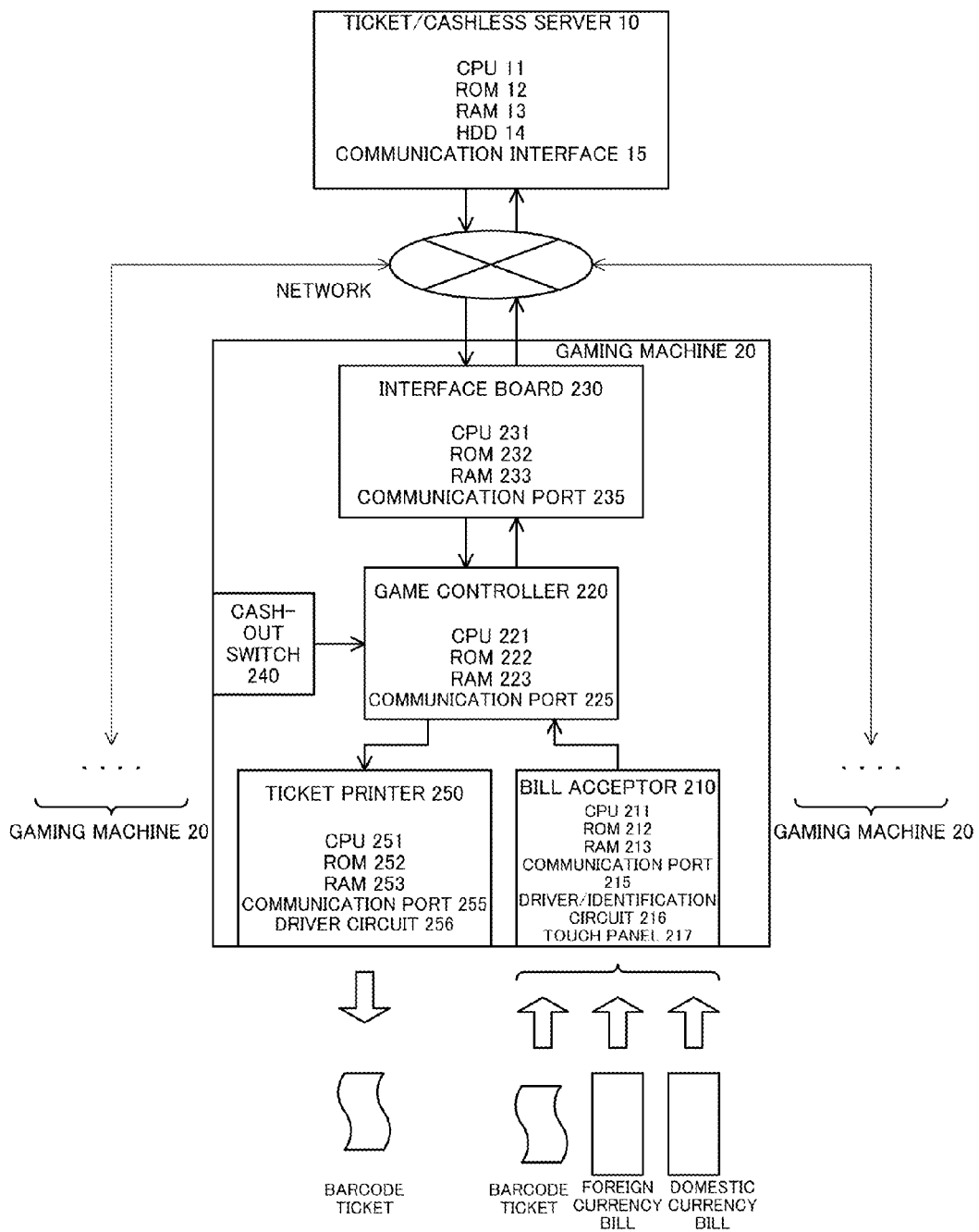
FIG. 1 is a schematic diagram illustrating an overview of a multi-currency gaming system 10 according to an embodiment of the present invention.

FIG. 1 is a schematic diagram illustrating an overview of a multi-currency gaming system 10 according to an embodiment of the present invention.

The multi-currency gaming system 10 includes a ticket/cashless server 10 and gaming machines 20. The gaming machines 20 are connected with the ticket/cashless server 10 via a network. A plurality of gaming machines 20 are installed in an amusement facility like a casino and connected with the ticket/cashless server 10.

<<Ticket/Cashless Server 10>>

The ticket/cashless server 10 includes a CPU (Central Processing Unit) 11, a ROM (Read Only Memory) 12, a RAM (Random Access Memory) 13, an HDD (Hard Disk Drive) 14, and a communication interface 15.

The CPU 11 performs a variety of arithmetic processing. The ROM 12 mainly holds programs to be executed by the CPU 11 and constants therefor. The RAM 13 stores data such as parameter values temporarily stored by the CPU 11 executing a program. The HDD 14 holds programs to be executed by the CPU 11 and a variety of data to manage the gaming machines 20. The programs held in the ROM 12 and the HDD 14 include the later-described subroutine illustrated in FIG. 5. The communication interface 15 is a device to send and receive a variety of data to and from the gaming machines 20.

<<Gaming Machine 20>>

Each gaming machine 20 includes a bill acceptor 210, a game controller 220, an interface board 230, a cash-out switch 240, and a ticket printer 250.

<Bill Acceptor 210>

The bill acceptor 210 includes a CPU 211, a ROM 212, a RAM 213, a communication port 215, a driver/identification circuit 216, and a touch panel 217.

The CPU 211 performs a variety of arithmetic processing. The ROM 212 mainly holds programs to be executed by the CPU 211 and constants therefor. The programs held in the ROM 212 include the later-described subroutine illustrated in FIG. 2. The RAM 213 holds parameter values temporarily stored by the CPU 211 executing a program. The communication port 215 is a device to send and receive a variety of data to and from the game controller 220.

The driver/identification circuit 216 includes a drive motor (not shown) and a scanner unit (not shown). When a bill or a barcode ticket is inserted, the driver/identification circuit 216 outputs a signal indicating the insertion. In response to an instruction from the CPU 211, the driver/identification circuit 216 takes in the bill or barcode ticket inserted by a player, scans the surface of the bill or barcode ticket, and outputs scan data to the CPU 211. The CPU 211 determines whether the inserted is a bill or a barcode ticket, whether the bill or the barcode ticket is real, and how much money or how many credits the bill or the barcode ticket values at.

The touch panel 217 includes a liquid crystal display unit and a touch sensor unit. The liquid crystal display unit displays a variety of character and graphic information in accordance with signals from the CPU 211. The touch sensor unit detects player's operations and outputs signals to the CPU 211.

<Game Controller 220>

The game controller 220 includes a CPU 221, a ROM 222, a RAM 223, and a communication port 225.

The CPU 221 performs a variety of arithmetic processing. The ROM 222 mainly holds programs to be executed by the CPU 221 and constants therefor. The programs held in the ROM 222 include the later-described subroutines illustrated in FIGS. 3 and 7. The RAM 223 holds parameter values temporarily stored by the CPU 221 executing a program. The communication port 225 is a device to send and receive a variety of data to and from the bill acceptor 210, the interface board 230, the cash-out switch 240, and the ticket printer 250.

<Interface Board 230>

The interface board 230 includes a CPU 231, a ROM 232, a RAM 233, and a communication port 235.

The CPU 231 performs a variety of arithmetic processing. The ROM 232 mainly holds programs to be executed by the CPU 231 and constants therefor. The programs held in the ROM 232 include the later-described subroutines illustrated in FIGS. 4 and 6. The RAM 233 holds parameter values temporarily stored by the CPU 231 executing a program. The communication port 235 is a device to send and receive a variety of data to and from the ticket/cashless server 10 and the game controller 220.

<Cash-Out Switch 240>

The cash-out switch 240 is a switch operable by a player. The cash-out switch 240 operated by a player outputs a signal indicating the operation of the player to the game controller 220.

To finish playing the game, the player operates the cash-out switch 240 for cash-out. As will be described later, in response to the player's operation of the cash-out switch 240, the ticket printer 250 prints and ejects a barcode ticket indicating the number of remaining credits owned by the player.

<Ticket Printer 250>

The ticket printer 250 includes a CPU 251, a ROM 252, a RAM 253, a communication port 255, and a driver circuit 256.

The CPU 251 performs a variety of arithmetic processing. The ROM 252 mainly holds programs to be executed by the CPU 251 and constants therefor. The RAM 253 holds parameter values temporarily stored by the CPU 251 executing a program. The communication port 255 is a device to send and receive a variety of data to and from the game controller 220. The driver circuit 256 is a circuit to drive a printer engine (not shown) in accordance with instructions from the CPU 251. The printer engine is a device to print and eject a barcode ticket.

<<<Processing in Multi-Currency Gaming System 10>>>

<<Processing in Bill Acceptor 210>>

Figure 2:
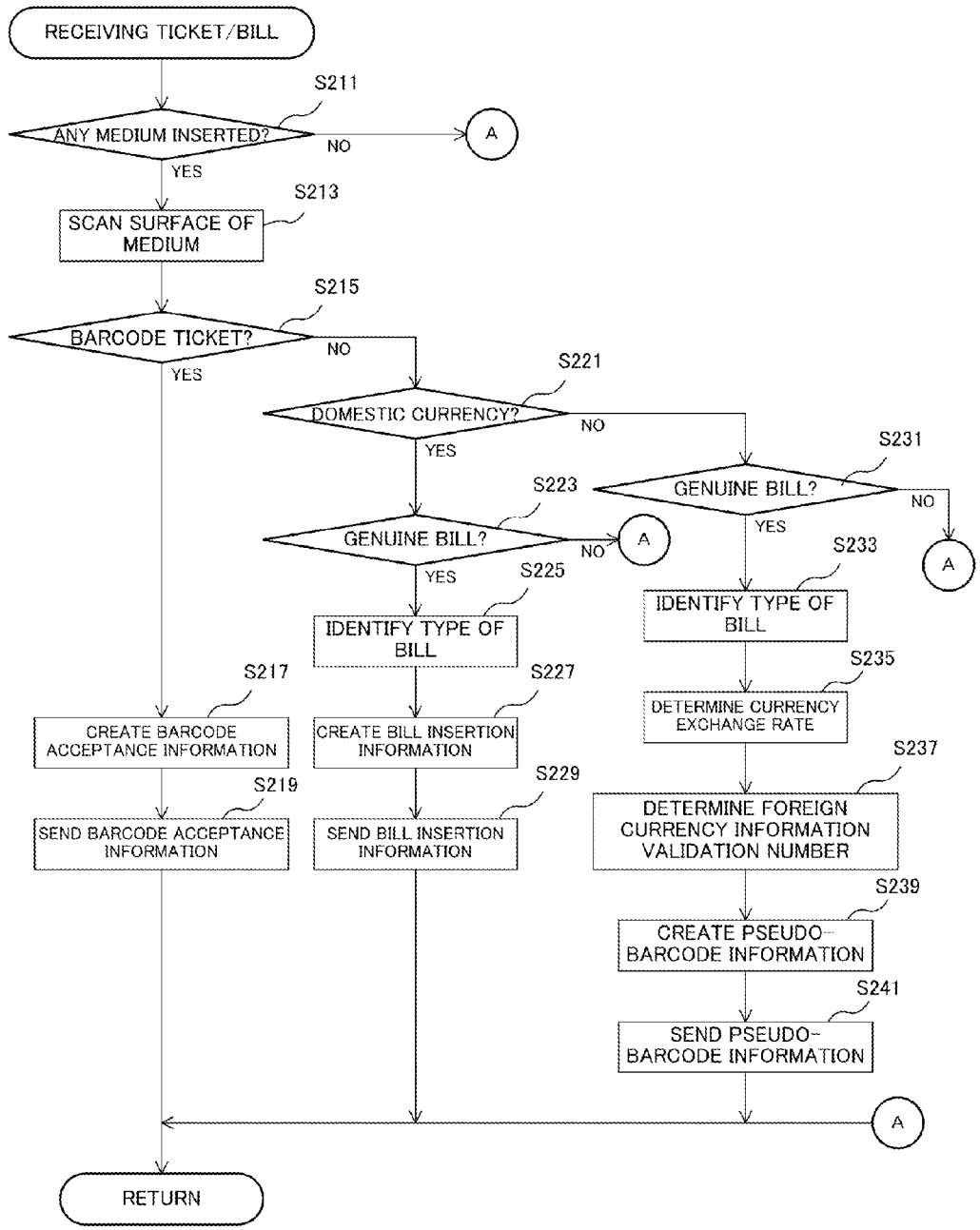
FIG. 2 is a flowchart illustrating a subroutine to be performed in a bill acceptor 210 upon insertion of a bill or a barcode ticket.

FIG. 2 is a flowchart illustrating a subroutine to be performed in the bill acceptor 210 upon insertion of a bill or a barcode ticket.

First, the CPU 211 of the bill acceptor 210 determines whether any medium such as a bill or a barcode ticket has been inserted (Step S211). This determination can be made by a signal output by the driver/identification circuit 216 in the bill acceptor 210.

If the determination is that no medium such as a bill or a barcode ticket has been inserted (NO), the CPU 211 of the bill acceptor 210 exits this subroutine.

If the determination is that a medium such as a bill or a barcode ticket has been inserted (YES), the CPU 211 of the bill acceptor 210 scans the surface of the medium such as a bill or a barcode ticket (Step S213).

Next, the CPU 211 of the bill acceptor 210 determines whether the inserted medium is a barcode ticket from the result of the scan (Step S215).

If the inserted medium is identified as a barcode ticket from the result of the scan (YES), the CPU 211 of the bill acceptor 210 creates barcode acceptance information (Step S217).

Next, the CPU 211 of the bill acceptor 210 sends the barcode acceptance information as bill acceptor output information to the game controller 220 (Step S219) and exits this subroutine.

The barcode ticket contains information such as the number of credits (amount of credit) and a validation code provided in a barcode style. The barcode acceptance information includes information such as the data indicating the number of credits, a validation code, and information indicating acceptance of a barcode ticket.

Figure 10A:
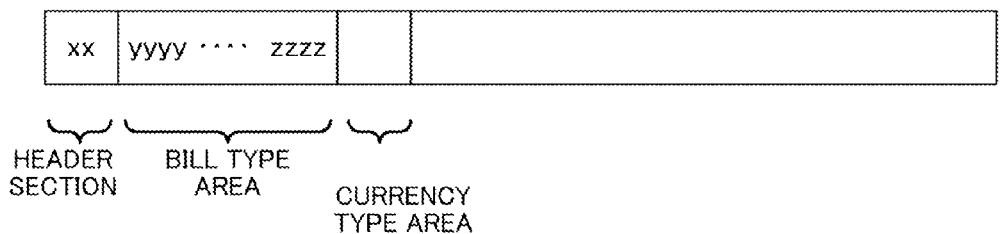
FIG. 10 shows a drawing (a) illustrating an example of the data format of bill insertion information, a drawing (b) illustrating an example of the data format of barcode acceptance information, and a drawing (c) illustrating an example of the data format of pseudo barcode information.
Figure 10B:
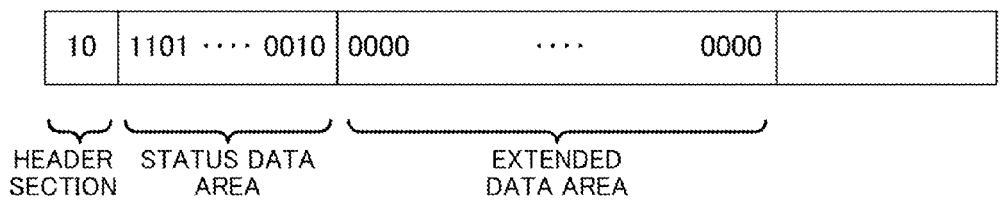

FIG. 10(*b*) is a drawing illustrating an example of the data format of the barcode acceptance information. The data format of the barcode acceptance information includes a header section, a status data area, and an extended data area.

The header section stores barcode identification data indicating that the barcode acceptance information is data about a barcode ticket. The barcode identification data stored in the header section enables the ticket/cashless server 10, the game controller 220, and the interface board 230 to recognize that the bill acceptor output information sent out as barcode acceptance information is data about a barcode ticket and perform processing for a barcode ticket.

Specifically, the barcode identification data stored in the header section causes the following processing. The bill acceptor 210 sends barcode acceptance information as bill acceptor output information to the game controller 220. At later-described Step S321 in FIG. 3, the game controller 220 sends a request for validation code check to the ticket/cashless server 10 via the interface board 230 based on the received barcode acceptance information. Thereafter, at Step S529 in FIG. 5, the ticket/cashless server 10 sends credit income information to the game controller 220 via the interface board 230 based on the received request for validation code check.

The status data area stores data retrieved by the bill acceptor 210 from the barcode ticket. For example, the number of credits and a validation code are stored in the status data area.

The extended data area is a reserved area for storing data about the barcode ticket possibly required in future. The barcode acceptance information in the present embodiment does not use this extended data area. Accordingly, the extended data area stores data indicating that the extended data area is not used.

As will be described later, the game controller 220 stores information held in the status data area and the extended data area of the barcode acceptance information received from the bill acceptor 210 in a request for validation code check and sends it to the ticket/cashless server 10.

If the determination obtained from the scan result at the foregoing Step S215 is that the inserted medium is not a barcode ticket (NO), the CPU 211 of the bill acceptor 210 determines whether the inserted bill is a domestic currency bill (Step S221).

If the determination is that the inserted bill is a domestic currency bill (YES), the CPU 211 of the bill acceptor 210 determines whether the inserted bill is genuine (Step S223). The ROM 212 in the bill acceptor 210 stores data on the surfaces of the domestic currency bills beforehand. The determination at Step S223 is comparing the scan data with the stored data on the surfaces to determine whether any match exists in the stored data.

If the determination at Step S223 is that the inserted bill is not genuine (NO), the CPU 211 of the bill acceptor 210 immediately exits this subroutine.

If the determination at Step S223 is that the inserted bill is genuine (YES), the CPU 211 of the bill acceptor 210 identifies the type of the inserted bill (Step S225). For example, it identifies the amount of the inserted bill.

Next, the CPU 211 of the bill acceptor 210 creates bill insertion information (Step S227). The bill insertion information includes data indicating the amount of the inserted bill and other data.

FIG. 10(*a*) is a drawing illustrating an example of the data format of the bill insertion information. The data format of the bill insertion information includes a header section, a bill type area, and a currency type area. This data format of the bill insertion information corresponds to "data in a domestic bill format".

The header section stores domestic currency identification data indicating that the medium inserted to the bill acceptor 210 is a domestic currency bill. By storing the domestic currency identification data in the header section, the bill acceptor output information sent from the bill acceptor 210 as barcode acceptance information enables the game controller 220 and the interface board 230 to recognize that a domestic currency bill has been inserted and perform processing for a domestic currency bill.

The bill type area stores data on the amount of the domestic currency bill inserted to the bill acceptor 210. The bill acceptor 210 scans the inserted domestic currency bill, identifies the amount, and stores the data on the amount to the bill type area.

FIG. 11 is a drawing illustrating relations between bill types and amounts. The example in FIG. 11 indicates the data on bill types in hexadecimal notation. To each of the bill types, one of the amounts ranging from 1 to 50,000 is assigned.

The currency type area stores the name of the domestic currency. The bill acceptor 210 in the present embodiment can select one of dollar, peso, lira, and others as the domestic currency. The currency type area stores data for identifying the selected domestic currency. In this way, the bill acceptor 210 can select one currency as the domestic currency from predetermined multiple currencies.

For example, if the bill type area holds "07" and the currency type area holds "dollar", the bill insertion information indicates that a 100 dollar bill has been inserted to the bill acceptor 210.

Next, the CPU 211 of the bill acceptor 210 sends the bill insertion information as bill acceptor output information to the game controller 220 (Step S229) and exits this subroutine.

If the determination at the foregoing Step S221 is that the inserted bill is not a bill in the domestic currency (NO), meaning that the inserted bill is a bill in a foreign currency, the CPU 211 of the bill acceptor 210 determines whether the inserted bill is genuine (Step S231). The ROM 212 in the bill acceptor 210 stores data on the surfaces of the acceptable foreign currency bills in advance. The determination at Step S223 is to determine whether any surface data held in advance matches the scan data through comparison.

If the determination at Step S231 is that the inserted bill is not genuine (NO), the CPU 211 of the bill acceptor 210 immediately exits this subroutine.

Next, the CPU 211 of the bill acceptor 210 determines the exchange rate (Step S235). The CPU 211 of the bill acceptor 210 displays a plurality of currency exchange rates on the touch panel 217. The player can select one exchange rate from the plurality of displayed exchange rates by operating the touch panel 217. In this way, the exchange rate can be determined. The exchange rate may be entered by the player through the touch panel 217 with reference to the exchange rates offered in the amusement facility such as a casino.

Next, the CPU 211 of the bill acceptor 210 determines a foreign currency information validation number (Step S237). The foreign currency information validation number is a special number predetermined for each foreign currency, such as "9999", and is foreign currency identification information to identify the foreign currency. The foreign currency information validation number is used in the processing of the ticket/cashless server 10 and the bill acceptor 210.

Next, the CPU 211 of the bill acceptor 210 creates pseudo barcode information (Step S239). The pseudo barcode information is information including the foreign currency information validation number.

Next, the CPU 211 of the bill acceptor 210 sends the created pseudo barcode information as bill acceptor output information to the game controller 220 (Step S241) and exits this subroutine.

Figure 10C:
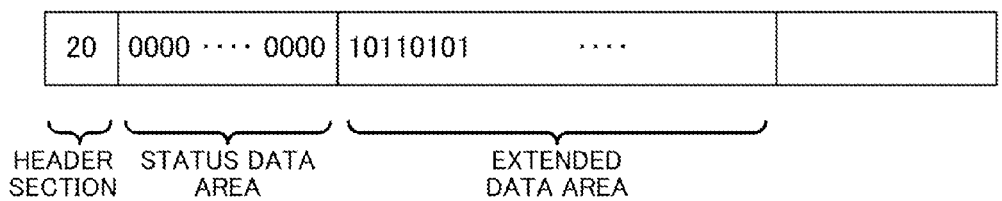

FIG. 10(c) is a drawing illustrating an example of the data format of the pseudo barcode information. The data format of the pseudo barcode information is the same as that of the barcode acceptance information, including a header section, a status data area, and an extended data area.

The header section stores barcode identification data indicating that the pseudo barcode information is data about a barcode ticket. That is to say, the header section stores the barcode identification data same as the one in the barcode acceptance information. As described above, the pseudo barcode information is used when a foreign currency bill, not a barcode ticket, is inserted, but the header section storing the barcode identification data leads the game controller 220 and the interface board 230 to perform processing assuming that a barcode ticket has been inserted to the bill acceptor 210. However, as will be described later, the pseudo barcode information leads the ticket/cashless server 10 to perform processing responsive to insertion of a foreign currency.

Specifically, the header section storing the barcode identification data leads to the following processing. The bill acceptor 210 sends the pseudo barcode information as bill acceptor output information to the game controller 220. At later-described Step S321 in FIG. 3, the game controller 220 sends a request for validation code check to the ticket/cashless server 10 via the interface board 230 based on the received pseudo barcode information. The game controller 220 and the interface board 230 can perform the same processing as the one in the case of insertion of a barcode ticket to the bill acceptor 210.

Figure 5:
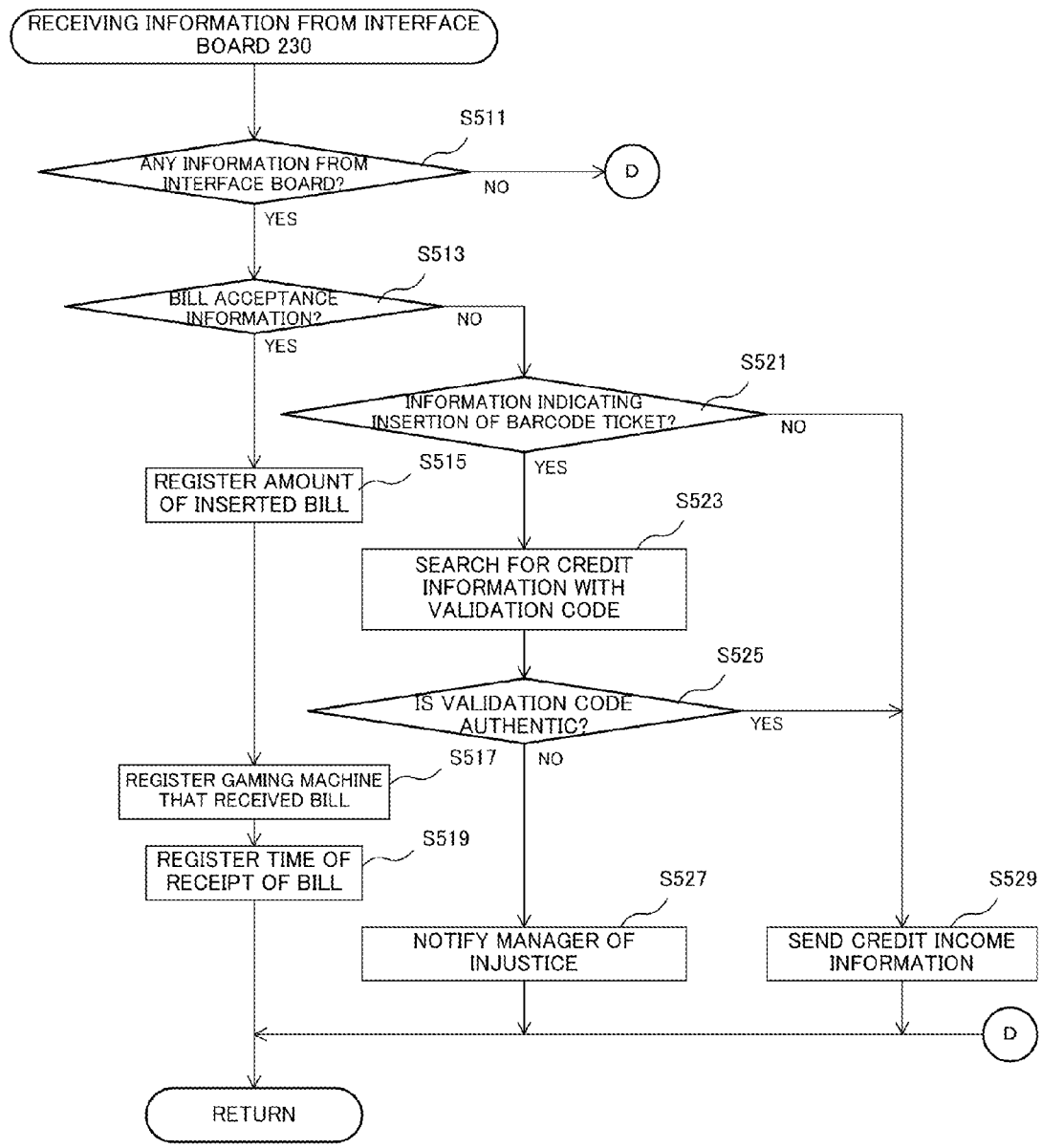
FIG. 5 is a flowchart illustrating a subroutine to be performed in a ticket/cashless server 10 upon receipt of bill acceptance information or a request for validation code check from an interface board 230.

Furthermore, at Step 529 in FIG. 5, the ticket/cashless server 10 sends credit income information to the game controller 220 via the interface board 230 based on the received request for validation code check. As will be described later, in the case where a barcode ticket is inserted to the bill acceptor 210, the ticket/cashless server 10 checks the validation code (Step S523 in FIG. 5). In the case where a foreign currency bill is inserted to the bill acceptor 210, the ticket/cashless server 10 creates credit income information (Step S529 in FIG. 5) without checking the validation code (Step S521 in FIG. 5). In this way, the ticket/cashless server 10 performs different processing depending on whether the inserted to the bill acceptor 210 is a barcode ticket or a foreign currency bill.

The status data area in the pseudo barcode information stores data such as the amount of the foreign currency bill (after exchanged at an exchange rate) and a foreign currency information validation number. As described above, the status data area in the barcode acceptance information holds the number of credits and a validation code. The amount of foreign currency bill in the pseudo barcode information corresponds to the number of credits in the barcode acceptance information and the foreign currency information validation number in the pseudo barcode information corresponds to the validation code in the barcode acceptance information. In this way, the status data area in the pseudo barcode information holds information corresponding to the information held in the status data area in the barcode acceptance information to be retrieved when the game controller 220 receives barcode acceptance information. As a result, when the game controller 220 receives pseudo barcode information, the game controller 220 identifies that it has received barcode acceptance information and performs the same processing.

The extended data area in the pseudo barcode information holds information such as information indicating that a foreign currency bill has been inserted to the bill acceptor 210, the type of the foreign currency bill, and the name of the foreign currency. The extended data area in the pseudo barcode information holds information which is not required for the processing of the game controller 220 but is required for the processing of the ticket/cashless server 10. Even though the extended data area of the pseudo barcode information holds information, the game controller 220 does not read the extended data area. Accordingly, when the game controller 220 receives pseudo barcode information, it reads the barcode identification data held in the header section and performs the processing responsive to receipt of a barcode ticket, assuming that it has received barcode acceptance information.

As will be described later, the game controller 220 stores information held in the status data area and the extended data area of the pseudo barcode information sent from the bill acceptor 210 in a request for validation code check and sends it to the ticket/cashless server 10. The ticket/cashless server 10 can acquire information such as the foreign currency information validation number, the type of the foreign currency bill, and the name of the foreign currency by reading the request for validation code check sent from the game controller 220. Consequently, the ticket/cashless server 10 recognizes that a foreign currency bill has been inserted to the bill acceptor 210 and performs the processing responsive to receipt of a foreign currency bill. In this way, the information held in the status data area and the extended data area of the pseudo barcode information is taken over by a request for validation code check and is sent to the ticket/cashless server 10.

In this way, the pseudo barcode information stores information indicating insertion of a barcode ticket (barcode identification data) and information indicating insertion of a foreign currency bill together.

In the present embodiment, the game controller 220 and the interface board 230 read the header section and determine that a barcode ticket has been inserted in both cases of insertion of a barcode ticket and a foreign currency bill to the bill acceptor 210. Consequently, even if a foreign currency bill has been inserted, the game controller 220 and the interface board 230 perform the same processing as the one in the case of insertion of a barcode ticket.

In the present embodiment, the ticket/cashless server 10 reads a request for validation code check sent from the game controller 220 via the interface board 230 to determine that a foreign currency bill has been inserted. As described above, the information held in the status data area and the extended data area in the pseudo barcode information is taken over by the request for validation code check. Hence, the ticket/cashless server 10 can perform the processing responsive to receipt of a foreign currency bill. Using an area not to be read by the game controller 220 or the interface board 230, such as the extended data area, enables the ticket/cashless server 10 to receive required information and perform the processing for a foreign currency bill.

The present embodiment has provided an example that the header section stores barcode identification data and the status data area and the extended data area store information related to receipt of a foreign currency bill; however, required is for the area to be read by the game controller 220 and the interface board 230 to store information indicating receipt of a barcode ticket or other necessary information and for the area not to be read by the game controller 220 or the interface board 230 but to be read by the ticket/cashless server 10 to store information related to receipt of a foreign currency bill.

Through the processing in FIG. 2, the bill acceptor 210 sends barcode acceptance information as bill acceptor output information to the game controller 220 in the case of insertion of a barcode ticket. In the case of insertion of a domestic currency bill, the bill acceptor 210 sends bill insertion information as bill acceptor output information to the game controller 220. In the case of insertion of a foreign currency bill, the bill acceptor 210 sends pseudo barcode information as bill acceptor output information to the game controller 220.

<<Processing in Game Controller 220>>

Figure 3:
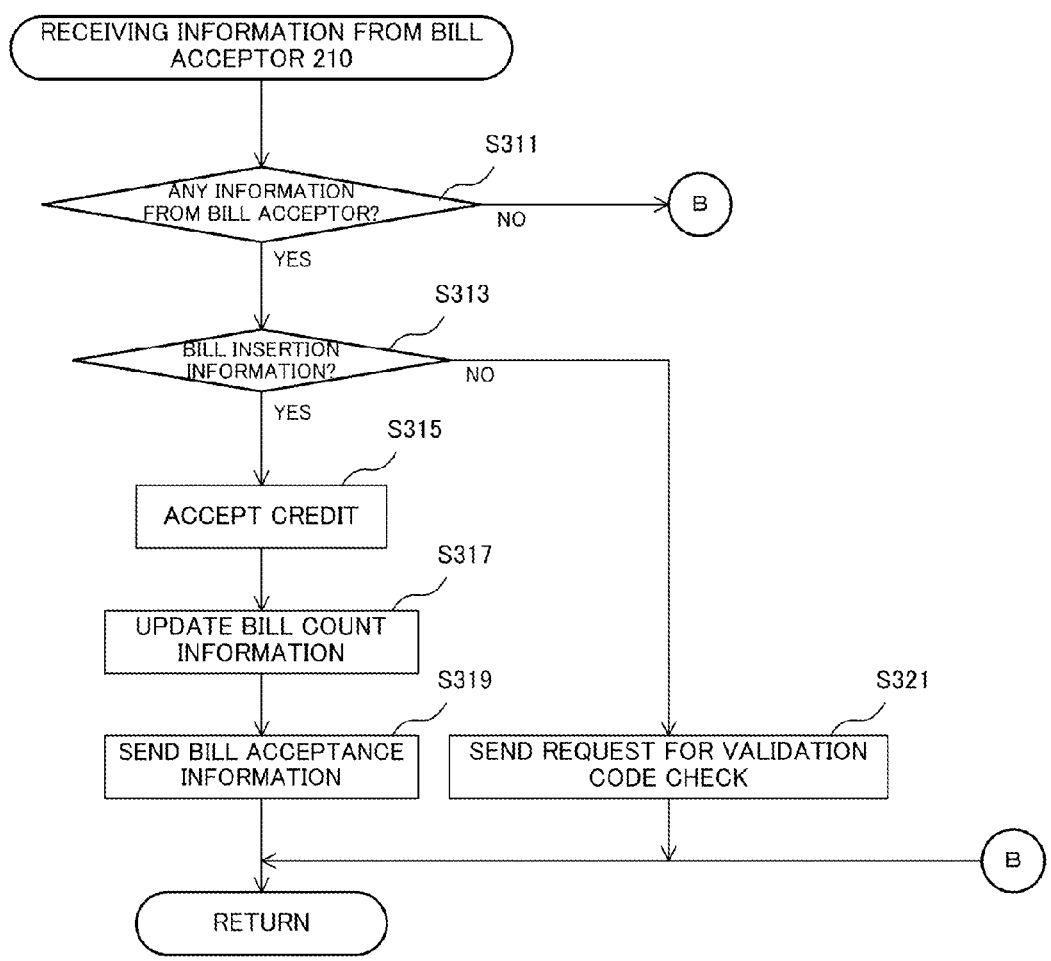
FIG. 3 is a flowchart illustrating a subroutine to be performed in a game controller 220 upon receipt of barcode acceptance information, bill insertion information, or pseudo barcode information from a bill acceptor 210.

FIG. 3 is a flowchart illustrating a subroutine to be performed in the game controller 220 upon receipt of barcode acceptance information, bill insertion information, or pseudo barcode information from the bill acceptor 210.

First, the CPU 221 of the game controller 220 determines whether any information has been received from the bill acceptor 210 (Step S311). If the determination is that no information has been received from the bill acceptor 210 (NO), the CPU 221 of the game controller 220 immediately exits this subroutine.

If the determination is that information has been received from the bill acceptor 210 (YES), the CPU 221 of the game controller 220 determines whether the received is bill insertion information (Step S313).

If the determination is that the received is bill insertion information (YES), meaning that the inserted to the bill acceptor 210 is a domestic currency bill, the CPU 221 of the game controller 220 performs credit acceptance to accept credit corresponding to the amount of the inserted bill (Step S315). Through this processing, the gaming machine 20 is permitted to start or continue the game.

Next, the CPU 221 of the game controller 220 updates the counters of domestic currency bills inserted to the bill acceptor 210 (Step S317). Further, it performs updating information on domestic currency bills.

Next, the CPU 221 of the game controller 220 sends bill acceptance information to the interface board 230 (Step S319) and exits this subroutine.

If the determination at the foregoing Step 313 is that the received is not bill insertion information (NO), meaning that the received is barcode acceptance information or pseudo barcode information, the CPU 221 of the game controller 220 sends a request for validation code check to the interface board 230 (Step S321) and exits this subroutine. In other words, when a barcode ticket or a foreign currency bill is inserted to the bill acceptor 210, the CPU 221 of the game controller 220 sends a request for validation code check to the interface board 230.

The validation code is a code for indicating that the barcode ticket inserted to the bill acceptor 210 is authentic. The validation code is registered and managed by the ticket/cashless server 10. By checking the validation code, whether the barcode ticket inserted to the bill acceptor 210 is authentic can be determined. Originally, a request for validation code check is information for the ticket/cashless server 10 to determine whether the barcode ticket is authentic upon insertion of the barcode ticket to the bill acceptor 210.

As illustrated in FIG. 3, even in the case where a foreign currency bill is inserted to the bill acceptor 210 and the game controller 220 receives pseudo barcode information, the game controller 220 performs the same processing as the one in the case of barcode acceptance information. That is to say, even if a foreign currency bill is inserted to the bill acceptor 210, the header section of the pseudo barcode information sent from the bill acceptor 210 holds barcode identification data. Accordingly, the game controller 220 assumes that a barcode ticket has been inserted to perform processing even if a foreign currency bill has been inserted. In other words, even if a foreign currency bill is inserted to the bill acceptor 210, the game controller 220 sends a request for validation code check to the interface board 230 at Step 321, assuming that a barcode ticket has been inserted virtually.

As described above, the status data area of barcode acceptance information holds information such as the number of credits and a validation code. On the other hand, the status data area of pseudo barcode information holds information such as the amount of foreign currency bill (after exchanged at an exchange rate) and a foreign currency information validation number so as to correspond to the barcode acceptance information. Consequently, in both cases of receipt of barcode acceptance information and pseudo barcode information, the game controller 220 can perform the same processing related to the number of credits (the amount of money) and the validation code (the foreign currency information validation number), assuming a barcode ticket has been inserted.

This configuration allows the game controller 220 to perform the same processing in both cases of insertion of a foreign currency bill and a barcode ticket to the bill acceptor 210. Accordingly, foreign currency bills can be handled without changing the programs to be executed in the game controller 220.

As described above, the game controller 220 conveys the information stored in the status data area and the extended data area of barcode acceptance information or pseudo barcode information sent from the bill acceptor 210 into a request for validation code check and sends the request to the ticket/cashless server 10. In this way, the foreign currency information validation number and information indicating receipt of a foreign currency bill required for the processing of the ticket/cashless server 10 can be stored in the request for validation code check and transferred. The ticket/cashless server 10 retrieves the necessary information from the request for validation code check to perform the processing for a foreign currency bill.

<<Processing in Interface Board 230>>

Figure 4:
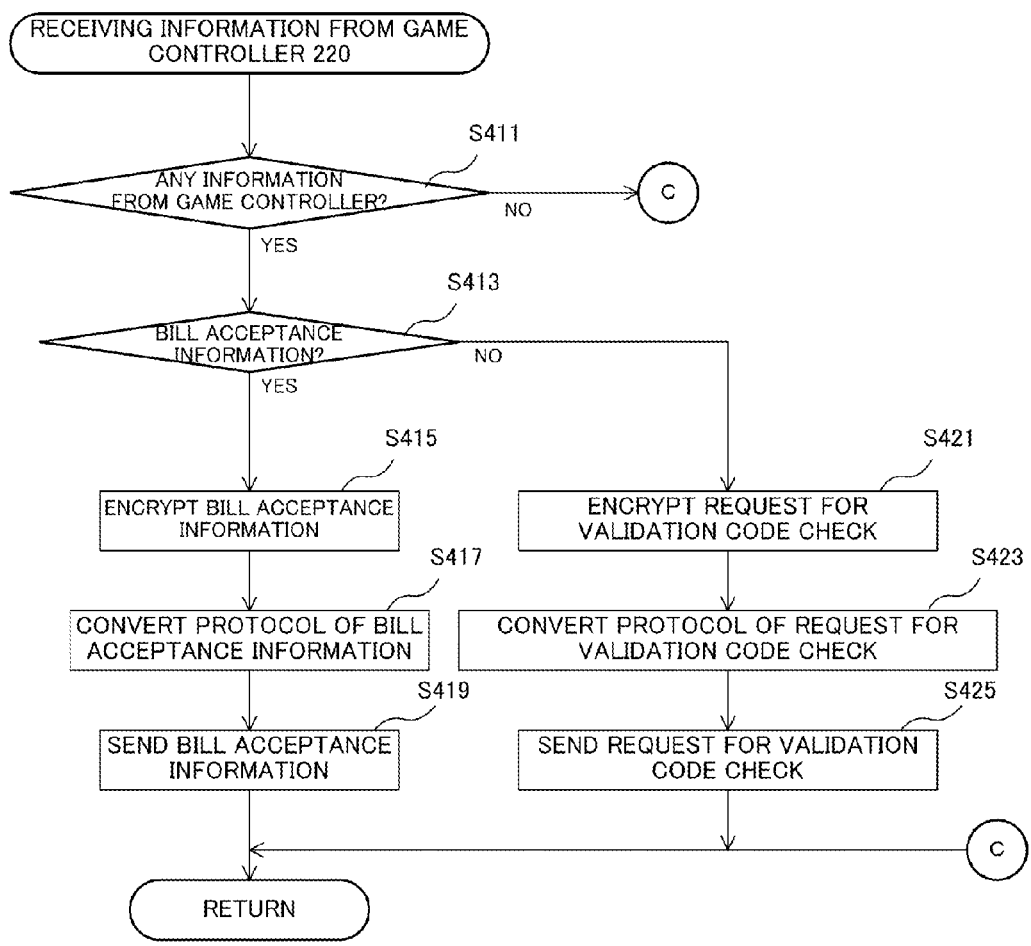
FIG. 4 is a flowchart illustrating a subroutine to be performed in an interface board 230 upon receipt of bill acceptance information or a request for validation code check from a game controller 220.

FIG. 4 is a flowchart illustrating a subroutine to be performed in the interface board 230 upon receipt of bill acceptance information or a request for validation code check from the game controller 220.

First, the CPU 231 of the interface board 230 determines whether any information has been received from the game controller 220 (Step S411). If the determination is that no information has been received from the game controller 220, the CPU 231 of the interface board 230 immediately exits this subroutine.

If the determination is that information has been received from the game controller 220 (YES), the CPU 231 of the interface board 230 determines whether the received is bill acceptance information (Step S413).

If the determination is that the received is bill acceptance information (YES), meaning that the inserted to the bill acceptor 210 is a domestic currency bill, the CPU 231 of the interface board 230 encrypts the received bill acceptance information (Step S415).

Next, the CPU 231 of the interface board 230 converts the protocol of the bill acceptance information (Step S417).

Next, the CPU 231 of the interface board 230 sends the encrypted and protocol-converted bill acceptance information to the ticket/cashless server 10 (Step S419) and exits this subroutine.

If the foregoing determination at Step S413 is that the received is not bill acceptance information (NO), meaning that the inserted to the bill acceptor is a barcode ticket or a foreign currency bill, the CPU 231 of the interface board 230 encrypts the received request for validation code check (Step S421).

Next, the CPU 231 of the interface board 230 converts the protocol of the request for validation code check (Step S423).

Next, the CPU 231 of the interface board 230 sends the encrypted and protocol-converted request for validation code check to the ticket/cashless server 10 (Step S425) and exits this subroutine.

As illustrated in FIG. 4, even in the case of insertion of a foreign currency bill to the bill acceptor 210, the game controller 220 sends a request for validation code check. Accordingly, the interface board 230 performs the same processing as the one in the case of insertion of a barcode ticket. That is to say, in both cases of insertion of a foreign currency bill and a barcode ticket to the bill acceptor 210, the interface board 230 performs the same processing. Accordingly, foreign currency bills can be handled without changing the programs to be executed in the interface board 230.

The request for validation code check sent by the game controller 220 includes information indicating that a barcode ticket has been inserted for the processing to be performed in the ticket/cashless server 10. However, in order for the interface board 230 to perform the same processing in both cases of insertion of a foreign currency bill and a barcode ticket to the bill acceptor 210, it is preferable that the information indicating that a foreign currency bill has been inserted be stored in an area that is not determined by the interface board 230, for example, a reserved area of the encrypted request for validation code check.

<<Processing in Ticket/Cashless Server 10>>

FIG. 5 is a flowchart illustrating a subroutine to be performed in the ticket/cashless server 10 upon receipt of bill acceptance information or a request for validation code check from the interface board 230.

First, the CPU 11 of the ticket/cashless server 10 determines whether any information has been received from the interface board 230 (Step S511). If the determination is that no information has been received from the interface board 230 (NO), the CPU 11 of the ticket/cashless server 10 immediately exits this subroutine.

If the determination is that information has been received from the interface board 230 (YES), the CPU 11 of the ticket/cashless server 10 determines whether the received is bill acceptance information (Step S513).

If the determination is that the received is bill acceptance information (YES), meaning that the inserted to the bill acceptor 210 is a domestic currency bill, the CPU 11 of the ticket/cashless server 10 stores the amount of the domestic currency bill inserted to the bill acceptor 210 (Step S515).

Next, the CPU 11 of the ticket/cashless server 10 stores gaming machine identification information identifying the gaining machine including the bill acceptor 210 that received the domestic currency bill (Step S517).

Next, the CPU 11 of the ticket/cashless server 10 stores the time of receipt of the bill acceptance information as an acceptance time (Step S519) and exits this subroutine.

The bill acceptance information includes information such as the amount of the domestic currency bill and the gaming machine identification information. Accordingly, the CPU 11 of the ticket/cashless server 10 can manage information such as the amount of the domestic currency bill, the gaming machine identification information, and the acceptance time as domestic currency acceptance information.

If the determination is that the received is not bill acceptance information (NO), meaning that the inserted to the bill acceptor 210 is a barcode ticket or a foreign currency bill, the CPU 11 of the ticket/cashless server 10 determines whether the inserted is a barcode ticket (Step S521). This determination is performed by the CPU 11 to determine whether the request for validation code check received by the ticket/cashless server 10 is created in response to receipt of a barcode ticket or a foreign currency bill. Since the request for validation code check received from the game controller 220 via the interface board 230 includes a foreign currency information validation number and information indicating that a foreign currency bill has been inserted, the determination at Step S521 can be made with the request for validation code check.

If the determination is that the inserted is a barcode ticket (YES), the CPU 11 of the ticket/cashless server 10 searches for information on credit tied with the validation code issued in the past (Step S523). The validation code is a code determined at cash-out when the ticket printer 250 prints and ejects a barcode ticket and is information printed on the barcode ticket together with the amount. The validation code is determined by the CPU 11 of the ticket/cashless server 10 and managed by the ticket/cashless server 10.

Next, the CPU 11 of the ticket/cashless server 10 determines whether the validation code is authentic (Step S525). If the determination is that the validation code is unauthentic (NO), meaning the barcode ticket inserted to the bill acceptor 210 is a counterfeit, the CPU 11 of the ticket/cashless server 10 issues information indicating the inserted barcode ticket is unauthentic (Step S527), and exits this subroutine. The manager of the amusement facility can notice an injustice with the barcode ticket from this information.

The validation code is a code to indicate that the barcode ticket is authentic. If the barcode ticket is authentically output from the ticket printer 250 through cash-out processing, the validation code for the barcode ticket is unexceptionally registered and managed by the ticket/cashless server 10. When a barcode ticket is inserted to a bill acceptor 210 later, the bill acceptor reads the validation code printed on the inserted barcode ticket and checks whether the validation code is registered in the ticket/cashless server 10. If the validation code is in registration of the ticket/cashless server 10, the inserted barcode ticket can be determined to be authentic. Contrarily, if the validation code is not in registration of the ticket/cashless server 10, the inserted barcode ticket can be determined to be counterfeit.

If the foregoing determination at Step S525 is that the validation code is authentic (YES), the CPU 11 of the ticket/ cashless server 10 sends credit income information to the interface board 230 (Step S529) and exits this subroutine. The credit income information is information to notify the game controller 220 that the barcode ticket is determined to be authentic through validation number check.

If the foregoing determination at Step S521 is that the inserted is not a barcode ticket (NO), meaning that the inserted is a foreign currency bill, the CPU 11 of the ticket/cashless server 10 immediately sends credit income information to the interface board 230 (Step S529) and exits this subroutine.

As described above, the credit income information is originally information to notify the game controller 220 that the barcode ticket is determined to be authentic through validation number check. The credit income information in the case of insertion of a foreign currency bill is, although there is no need to check the validation number since the inserted is not a barcode ticket, to notify the game controller 220 that the result of validation number check indicates the barcode ticket is authentic, assuming that a barcode ticket has been virtually inserted. In this way, credit income information is created even in the case of insertion of a foreign currency bill; accordingly, the CPU 221 of the game controller 220 can perform the same processing as the one in the case of insertion of a barcode ticket.

As described above, the CPU 11 of the ticket/cashless server 10 creates credit income information without checking a validation code in the case of determination that the inserted is a foreign currency bill. This avoids wrong identification of an inserted foreign currency bill as a counterfeit barcode ticket.

<<Processing in Interface Board 230>>

Figure 6:
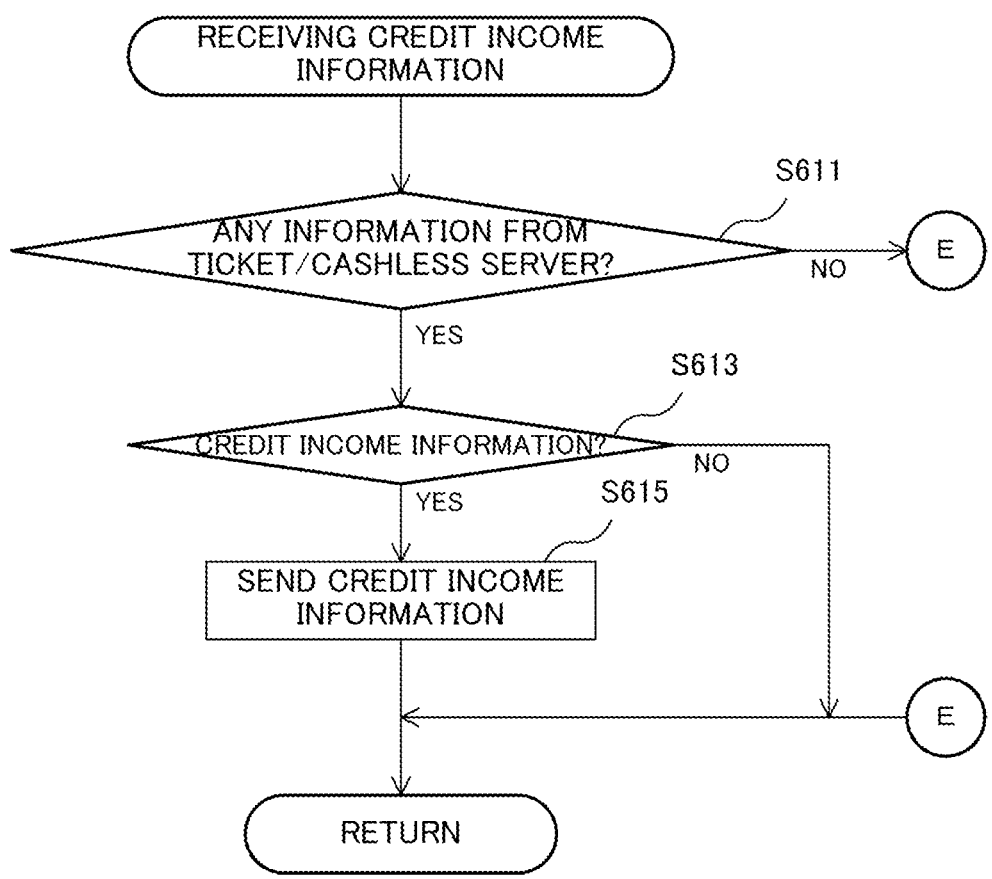
FIG. 6 is a flowchart illustrating a subroutine to be performed in the interface board 230 upon receipt of credit income information from the ticket/cashless server 10.

FIG. 6 is a flowchart illustrating a subroutine to be performed by the interface board 230 upon receipt of credit income information from the ticket/cashless server 10.

First, the CPU 231 of the interface board 230 determines whether any information has been received from the ticket/cashless server 10 (Step S611). If the determination is that no information has been received from the ticket/cashless server 10 (NO), the CPU 231 of the interface board 230 immediately exits this subroutine.

If the determination is that information has been received from the ticket/cashless server 10 (YES), the CPU 231 of the interface board 230 determines whether the received is credit income information (Step S613). If the determination is that the received is not credit income information (NO), the CPU 231 of the interface board 230 immediately exits this subroutine.

If the determination is that the received is credit income information (YES), the CPU 231 of the interface board 230 sends the credit income information to the game controller 220 (Step S615) and exits this subroutine.

<<Processing in Game Controller 220>>

Figure 7:
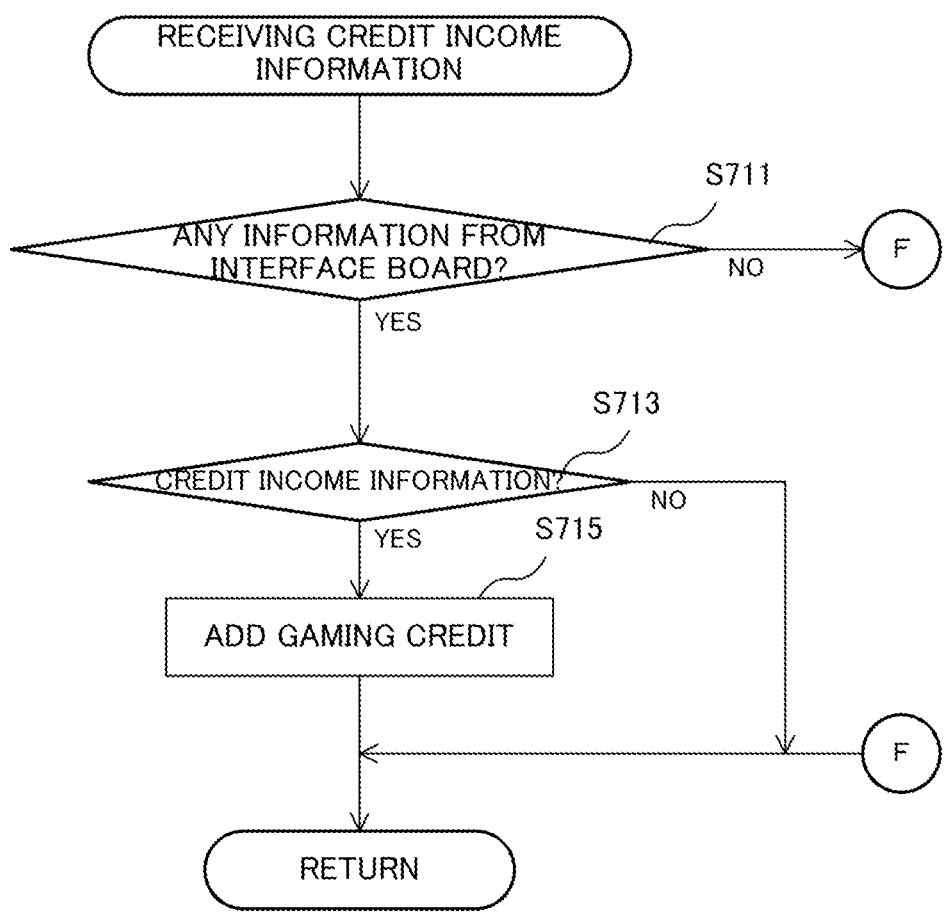
FIG. 7 is a flowchart illustrating a subroutine to be performed in the game controller 220 upon receipt of credit income information from the interface board 230.

FIG. 7 is a flowchart illustrating a subroutine to be performed in the game controller 220 upon receipt of credit income information from the interface board 230.

First, the CPU 221 of the game controller 220 determines whether any information has been received from the interface board 230 (Step S711). If the determination is that no information has been received from the interface board 230 (NO), the CPU 221 of the game controller 220 immediately exits this subroutine.

If the determination is that information has been received from the interface board 230 (YES), the CPU 221 of the game controller 220 determines whether the received is credit income information (Step S713). If the determination is that the received is not credit income information (NO), the CPU 221 of the game controller 220 immediately exits this subroutine.

If the determination is that the received is credit income information (YES), the CPU 221 of the game controller 220 adds the number of credits corresponding to the amount included in the credit income information (Step S715) and exits this subroutine. Thus, processing on the credit required for the player to play game with the gaming machine is completed.

<<Processing in Ticket/Cashless Server 10, Bill Acceptor 210, Game Controller 220, and Interface Board 230>>

As described above, FIG. 2 is processing performed in the bill acceptor 210; FIGS. 3 and 7 are processing performed in the game controller 220; FIGS. 4 and 6 are processing performed in the interface board 230; and FIG. 5 is processing performed in the ticket/cashless server 10.

As to the processing performed in the game controller 220 (FIGS. 3 and 7) and the processing performed in the interface board 230 (FIGS. 4 and 6), the same processing in the case of insertion of a barcode ticket to the bill acceptor 210 is performed in the case of insertion of a foreign currency bill to the bill acceptor 210. Accordingly, the processing can be performed without changing the programs in the game controller 220 and the interface board 230 even if a foreign currency bill is inserted to the bill acceptor 210. Therefore, the existing game controller 220 and interface board 230 can be used as they are without changing their specifications.

However, as to the processing performed in the bill acceptor 210 (FIG. 2) and the processing performed in the ticket/cashless server 10 (FIG. 5), processing to be performed in the case of insertion of a foreign currency bill is added.

As understood, to handle a foreign currency bill, required are only the changes in the programs for the bill acceptor 210 and the ticket/cashless server 10 and no change is required for the programs in the game controller 220 and the interface board 230. Thus, only a part of the various apparatuses installed in an amusement facility needs change to handle foreign currency bills; the amusement facility can be easily reorganized to support the domestic currency and foreign currencies (multiple currencies), utilizing an existing system.

<<<Processing Flow>>>

Figure 8:
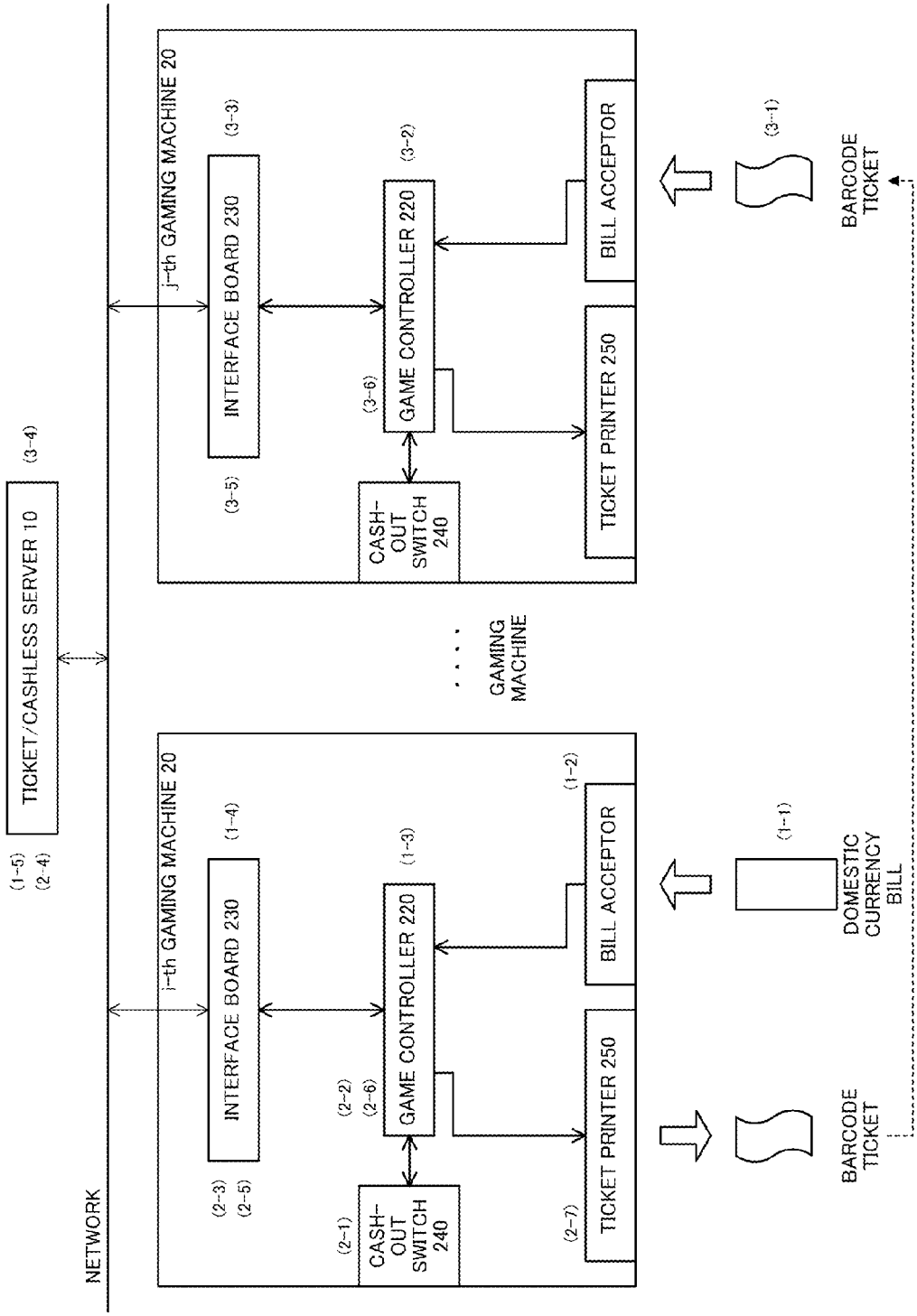
FIG. 8 is a diagram illustrating an outline of processing with a domestic currency bill, a barcode ticket, and a foreign currency bill.
Figure 9:
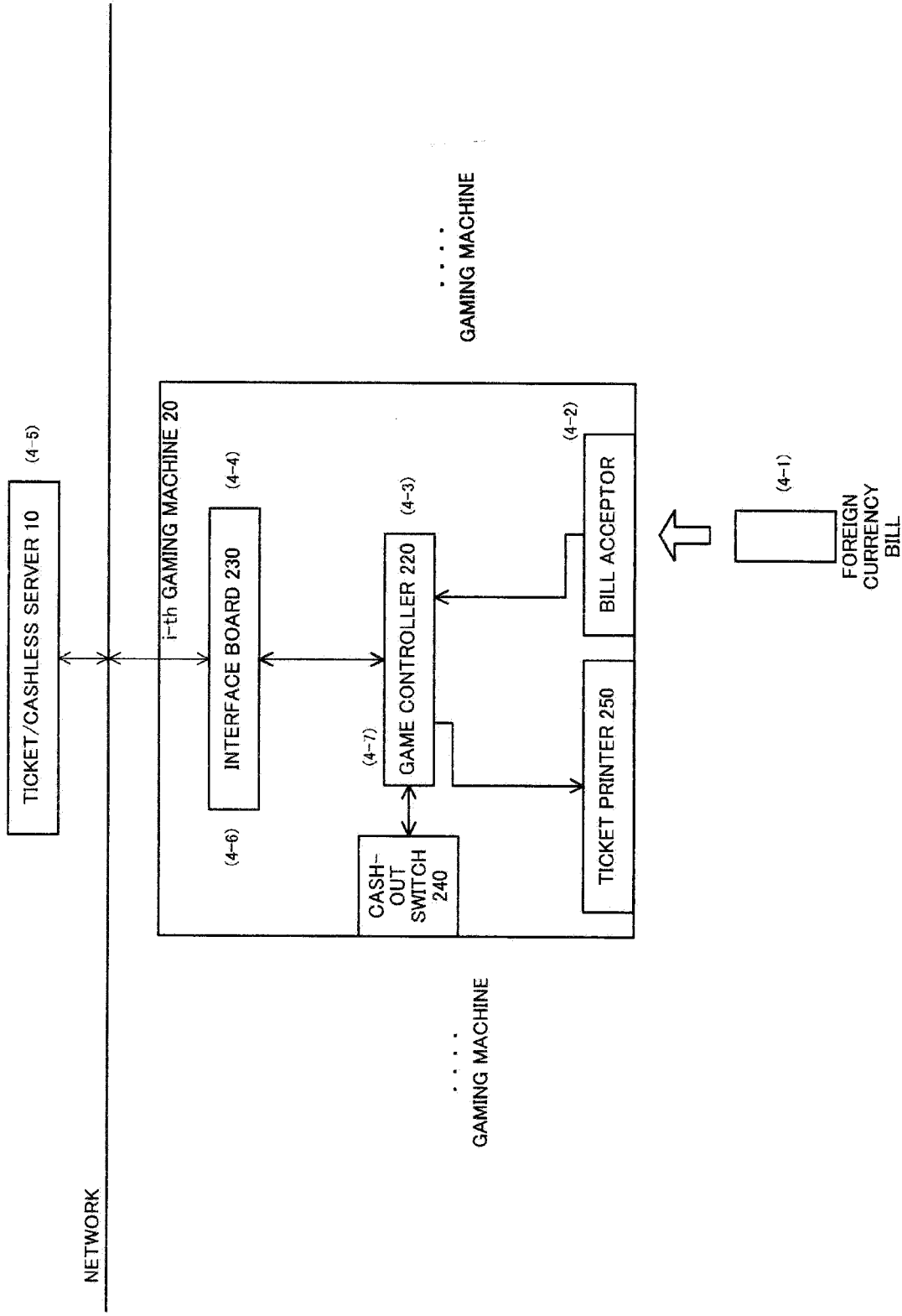
FIG. 9 is a diagram illustrating an outline of processing with a domestic currency bill, a barcode ticket, and a foreign currency bill.

FIGS. 8 and 9 are diagrams illustrating an outline of processing with a domestic currency bill, a barcode ticket, and a foreign currency bill. FIGS. 8 and 9 are equivalent to the schematic diagram of the multi-currency gaming system 10 illustrated in FIG. 1. FIGS. 8 and 9 illustrate that an i-th gaming machine 20 and a j-th gaming machine 20 in an amusement facility are connected with a ticket/cashless server 10 via a network. In FIGS. 8 and 9, the gaming machines 20 other than the i-th and the j-th gaining machines 20 are omitted. The reference signs (1-1) to (1-5), (2-1) to (2-7), (3-1) to (3-6), and (4-1) to (4-7) in the following description correspond to the reference signs appearing in FIGS. 8 and 9.

<<Processing in Existing Common Single-Currency Cashless System Using Barcode Ticket>>

<Processing Upon Insertion of Domestic Currency Bill>>

(1-1) A player inserts a domestic currency bill to the bill acceptor 210 of the i-th gaming machine 20 to start playing games with the i-th gaming machine 20.

(1-2) The bill acceptor 210 determines whether the domestic currency bill is genuine and identifies the type of the bill (Steps 223 and S225 in FIG. 2); if genuine, the bill acceptor 210 sends bill insertion information to the game controller 220 (Step S229 in FIG. 2).

(1-3) The game controller 220 accepts credit and updates bill count information and other information in accordance with the bill insertion information from the bill acceptor 210 (Steps 315 and S317 in FIG. 3). Further, it sends bill acceptance information to the interface board 230 (Step S319 in FIG. 3). The bill acceptance information is information to inform the ticket/cashless server 10 of receipt of cash.

(1-4) The interface board 230 encrypts the bill acceptance information from the game controller 220 and converts its protocol (Steps S415 and S417 in FIG. 4).

Subsequently, the interface board 230 forwards bill acceptance information to the ticket/cashless server 10.

(1-5) The ticket/cashless server 10 registers the bill acceptance information received from the interface board 230 as domestic currency acceptance information including the amount of the inserted bill, the identification information on the gaming machine that received the bill, the time of receipt, and others (Steps S515, S517, and S519 in FIG. 5).

<Processing to End Gaines>

(2-1) To end playing games in the i-th gaming machine 20, the player operates the cash-out switch 240 to execute credit takeout processing in order to take out the credit in the i-th gaming machine 20.

(2-2) The game controller 220 sends a credit takeout request to the interface board 230 in response to the execution of the credit takeout processing by the player. The credit takeout request is information to inform the ticket/cashless server 10 that the player has executed credit takeout processing.

(2-3) The interface board 230 encrypts the credit takeout request sent from the game controller 220 and converts its protocol, and forwards it to the ticket/cashless server 10.

(2-4) The ticket/cashless server 10 receives the credit takeout request sent from the interface board 230, and issues and manages a validation code to be printed on a barcode ticket. Subsequently, the ticket/cashless server 10 sends a request to print/issue a barcode to the interface board 230. The request to print/issue a barcode is information to print a validation code on a barcode ticket and information to be sent to the game controller 220 via the interface board 230.

(2-5) The interface board 230 receives the request to print/issue a barcode sent from the ticket/cashless server 10 and forwards the request to print/issue a barcode to the game controller 220.

(2-6) The game controller 220 receives the request to print/issue a barcode sent from the ticket/cashless server 10 via the interface board 230. Subsequently, the game controller 220 sends a request to print a validation code to the ticket printer 250, and upon completion of printing, sends a completion of issuance of a barcode ticket to the ticket/cashless server 10 to complete the credit takeout processing.

(2-7) The ticket printer 250 receives the request to print a validation code sent from the game controller 220 and prints a barcode ticket.

As described in the foregoing processing (2-4), the ticket/cashless server 10 issues and manages a validation code to be printed on a barcode ticket in response to the credit takeout request sent by the game controller 220. The validation code is a check code unique to barcode tickets and is associated with a barcode ticket printed by the ticket printer 250.

Validation codes are managed by the ticket/cashless server 10. When the ticket printer 250 prints a barcode ticket, the ticket/cashless server 10 ties a validation code with the credit data and stores it to a database for barcode ticket management.

In the above-described processing (2-4), the ticket/cashless server 10 issues a validation code; however, the ticket printer 250 may issue a validation code. Specifically, in response to the player's operation of the cash-out switch 240, the ticket printer 250 sends a validation code to the ticket/cashless server 10, and the ticket/cashless server 10 ties the validation code with the credit data and stores it to the database for barcode ticket management.

Alternatively, the ticket printer 250 may issue a validation code and tie the validation code of the ticket printer 250 with the credit data. The ticket printer 250 may have a database for barcode ticket management and manage the validation codes tied with credit data.

<Processing Upon Insertion of Barcode Ticket>

(3-1) When the player wants to transfer the credit to the j-th gaming machine 20 using a barcode ticket previously acquired (through the foregoing processing (2-7)), the player inserts the barcode ticket to the bill acceptor 210 of the j-th gaming machine 20. The bill acceptor 210 determines that the inserted is a barcode ticket and sends a validation code provided in a barcode style and information indicating that a barcode ticket has been accepted (barcode acceptance information) to the game controller 220 (Step S219 in FIG. 2).

(3-2) The game controller 220 receives the barcode acceptance information sent from the bill acceptor 210 and sends a request for validation code check to the interface board 230 (Step S321 in FIG. 3). The request for validation code check is information for the ticket/cashless server 10 to start checking a validation code provided in a barcode style.

(3-3) The interface board 230 encrypts the request for validation code check sent from the game controller 220 and converts its protocol (Steps S421 and S423 in FIG. 4) and forwards the request for validation code check to the ticket/cashless server 10 (Step S425 in FIG. 4).

(3-4) The ticket/cashless server 10 receives the request for validation code check sent from the interface board 230 and determines whether it is a request for validation code check issued in response to insertion of a predetermined foreign currency bill or a request for validation code check issued in response to insertion of a barcode ticket (Step S521 in FIG. 5). In the case of a request for validation number check issued in response to insertion of a barcode ticket, the ticket/cashless server 10 retrieves the credit information tied with the previously issued validation number (Step S523 in FIG. 5) and determines whether the validation number is authentic (Step S525 in FIG. 5) like in the traditional processing. If no problem is found in the authentication determination, the ticket/cashless server 10 sends credit income information to the game controller 220 via the interface board 230 (Step S529 in FIG. 5).

(3-5) The interface board 230 receives the credit income information sent from the ticket/cashless server 10 and forwards the credit income information to the game controller 220 (Step S615 in FIG. 6).

(3-6) The game controller 220 receives the credit income information sent from the ticket/cashless server 10 via the interface board 230, performs credit addition in the j-th gaming machine 20 (Step S715 in FIG. 7), and completes the cashless credit transfer using a barcode ticket.

<Processing Upon Insertion of Foreign Currency Bill>

(4-1) A player having foreign currency bills inserts a foreign currency bill to the bill acceptor 210 of the i-th gaming machine 20 to start playing games with the i-th gaming machine 20. At this time, the player can refer to currency exchange rates using the currency exchange information displayed on the touch panel 217 or currency exchange rates provided in the facility (Step S235 in FIG. 2).

(4-2) The bill acceptor 210 determines whether the bill is genuine and identifies the type of the bill in response to insertion of a foreign currency bill (Steps S231 and S233 in FIG. 2); if genuine, determines a predetermined foreign currency information validation number; and sends pseudo barcode information including the foreign currency information validation number (Steps S237 and S239 in FIG. 2) to the game controller 220 (Step S241).

(4-3) The game controller 220 receives the pseudo barcode information sent from the bill acceptor 210 and sends a request for validation code check to the interface board 230. The request for validation code check is information for the ticket/cashless server 10 to start checking a validation code provided in a barcode style. This processing (4-3) is the same as the processing (3-2).

(4-4) The interface board 230 encrypts the request for validation code check sent from the game controller 220 and converts its protocol (Steps S421 and S423 in FIG. 4) and forwards the request for validation code check to the ticket/cashless server 10 (Step S425 in FIG. 4). This processing (4-4) is the same as the processing (3-3).

(4-5) The ticket/cashless server 10 receives the request for validation code check sent from the interface board 230 and determines whether it is a request for validation code check issued in response to insertion of a predetermined foreign currency bill or a request for validation code check issued in response to insertion of a barcode ticket (Step S521 in FIG. 5). If the determination is that it is a request for validation code check issued in response to insertion of a foreign currency bill, the ticket/cashless server 10 sends a credit corresponding to the received amount as credit income information to the game controller 220 via the interface board 230 (Step S529 in FIG. 5).

(4-6) The interface board 230 receives the credit income information sent from the ticket/cashless server 10 and forwards the credit income information to the game controller 220 (Step S615 in FIG. 6). This processing (4-6) is the same as the processing (3-5).

(4-7) The game controller 220 receives the credit income information sent from the ticket/cashless server 10 via the interface board 230 and executes credit addition in the i-th gaining machine 20 (Step S715 in FIG. 7). Thus, the game controller 220 completes the acceptance of a foreign currency bill in the same procedure as the cashless credit transfer using a barcode ticket. The processing (4-7) is the same as the processing (3-6).

The above-described example has described a case in which the ticket/cashless server 10 determines whether a received request for validation code check is a request for validation code check issued in response to insertion of a foreign currency bill or a request for validation code check issued in response to insertion of a barcode ticket. To implement this determination, the program to be executed in the ticket/cashless server 10 needs to be changed to support foreign currency bills.

However, even if the program in the ticket/cashless server 10 is not changed, a management database configured to store and hold all the requests for validation code check sent from the game controllers 220 can provide data such as a foreign currency information validation number, an amount exchanged at an exchange rate, the type of the foreign currency bill, and the name of the foreign currency included in a request for validation code check through searching the stored management data base at a later time. Thus, the existing cashless system can be easily converted to a multi-currency cashless system at low cost without changing the program in the ticket/cashless server 10.

<<<Information to be Sent and Received>>>
<<Bill Insertion Information>>
The bill insertion information is information to be sent from the bill acceptor 210 to the game controller 220 when the bill acceptor 210 determines that a domestic currency bill has been inserted and identifies the bill as genuine. The bill insertion information corresponds to "data in a domestic bill format".

<<Bill Acceptance Information>>
The bill acceptance information is information for notifying the ticket/cashless server 10 of receipt of money and to be sent from the game controller 220 to the ticket/cashless server 10. The bill acceptance information corresponds to "first bill acceptance information".

<<Barcode Acceptance Information>>
The barcode acceptance information includes information indicating acceptance of a barcode ticket in response to insertion of a barcode ticket to the bill acceptor 210. The barcode acceptance information includes a validation code provided in a barcode style. The barcode acceptance information is information to be sent from the bill acceptor 210 to the game controller 220. The barcode acceptance information corresponds to "credit image data acceptance information". The validation code corresponds to "authenticity validation information". The barcode acceptance information corresponds to "data in a ticket format obtained through reading a ticket printed in a barcode style".

<<Pseudo Barcode Information>>
The pseudo barcode information is information to be sent from the bill acceptor 210 to the game controller 220 when the bill acceptor 210 determines that a foreign currency bill has been inserted and identifies the bill as genuine. The pseudo barcode information includes a foreign currency information validation number. The pseudo barcode information corresponds to "pseudo credit image data information". The foreign currency information validation number corresponds to "foreign currency identification information". The pseudo barcode information further corresponds to "data converted into the ticket format" and "conversion data to be used in converting information on a bill other than domestic bills into data in a ticket format readable by the game controller".

<<Request for Validation Code Check>>
The request for validation code check is information to be created by the game controller 220 and sent to the ticket/cashless server 10 when the game controller 220 receives barcode acceptance information or pseudo barcode information from the bill acceptor 210. In the case of a barcode ticket, the request for validation code check includes information for the ticket/cashless server 10 to start checking a validation code provided in a barcode style. In the case of a foreign currency bill, the request for validation code check includes information to notify the ticket/cashless server 10 of insertion of a foreign currency bill. The request for validation code check corresponds to "authenticity check information".

<<Credit Income Information>>
The credit income information is information to be created by the ticket/cashless server 10 and sent to the game controller 220 when the ticket/cashless server 10 receives barcode acceptance information or pseudo barcode information from the game controller 220. In the case of a barcode ticket, the credit income information is information to notify the game controller 220 that the ticket/cashless server 10 has checked the validation number and the barcode ticket is authentic. In the case of a foreign currency bill, it is information to notify the game controller 220 that the barcode ticket is authentic as a result of virtual check of the validation number. The credit income information corresponds to "credit information".

Modified Examples

The above-described embodiment provided an example that, in the case of insertion of a foreign currency bill to the bill acceptor 210, the bill acceptor 210 performs currency exchange. The currency exchange is not limited to this example and may be performed at the ticket/cashless server 10. If the bill acceptor 210 performs the currency exchange, the ticket/cashless server 10 provides information on the exchange rate to the bill acceptor 210; however, if the ticket/cashless server 10 does, providing information on the exchange rate is not necessary, achieving simpler currency exchange.

In the above-described embodiment, the ticket/cashless server 10 determines whether a request for validation code check is issued in response to insertion of a barcode ticket or a foreign currency bill at the determination at Step S521 in FIG. 5 and further determines whether the validation code is authentic at Step S525. Through these steps, if the bill acceptor 210 wrongly identifies an inserted counterfeit foreign currency bill as genuine, the ticket/cashless server 10 determines that the request for validation code check is in response to insertion of a barcode ticket at Step S521, but determines that the validation code is unauthentic at Step 525. Accordingly, even if a counterfeit foreign currency bill is inserted, the ticket/cashless server 10 will not wrongly determine that a barcode ticket has been inserted, improving the reliability of the system.

In the meanwhile, if the bill acceptor can determine whether the bill is genuine or counterfeit with higher accuracy, Step S521 can be omitted. That is to say, the determination whether the request for validation code check is in response to insertion of a barcode ticket or a foreign currency bill can be omitted to directly perform the processing at Steps S523 and S525. In this case, immediate determination that the inserted is a foreign currency bill can be made unless the validation code is authentic, achieving simpler processing at the ticket/cashless server 10.

REFERENCE SIGNS LIST

10 Ticket/Cashless Server
210 Bill acceptor
220 Game controller
230 Interface board

The invention claimed is:

1. A bill acceptor for identifying inserted media including a bill, the bill acceptor comprising a bill acceptor control unit including:
   a first output control unit for outputting a first type of bill insertion information indicating insertion of a first type of bill in a first currency upon insertion of the first type of bill;
   a medium output control unit for outputting credit image data acceptance information including image data-printed medium identification information indicating insertion of an image data-printed medium, on which credit image data obtained by converting credit data representing credit owned by a player into an image is printed, upon insertion of the image data-printed medium; and
   a second output control unit for outputting pseudo credit image data information including the image data-printed medium identification information and a second type of bill insertion information indicating insertion of a second type of bill in a second currency different from the first currency upon insertion of the second type of bill; wherein,
   when the first type of bill is inserted, the first type of bill insertion information is output to a user terminal controller and operation of the user terminal is permitted; and wherein,
   when one of an image data-printed medium or a second type of bill is inserted, respectively, a management server determines whether operation of the user terminal is to be permitted.

2. A bill acceptor according to claim 1, wherein
   the medium output control unit includes authenticity validation information indicating that the image data-printed medium is authentic and the image data-printed medium identification information in the credit image data acceptance information in a case where the image data-printed medium is authentic, and
   wherein the second output control unit includes foreign currency identification information for identifying the second currency in the pseudo credit image data information as the second type of bill insertion information.

3. A bill acceptor according to claim 1, wherein the second output control unit converts an amount of a bill in the second currency using a currency exchange rate for the second currency in a case of insertion of a bill in the second currency.

4. A bill acceptor according to claim 1,
   wherein the user terminal is a gaming machine and the user terminal controller is a game controller,
   wherein the game controller outputs first bill acceptance information related to a bill in the first currency in a case of receipt of the first type of bill insertion information,
   wherein the game controller outputs an authenticity check information to check whether the image data-printed medium is authentic in a case of receipt of the credit image data acceptance information or the pseudo credit image data information, and
   wherein the bill acceptor outputs the first type of bill insertion information, the credit image data acceptance information, or the pseudo credit image data information to the game controller.

5. A bill acceptor according to claim 4,
   wherein the management server is connected with the game controller to be able to communicate with each other,
   wherein the management server performs processing related to an amount of the bill in the first currency in a case of receipt of the first bill acceptance information,
   wherein the management server determines whether the image data-printed medium is authentic in a case of receipt of the authenticity check information and insertion of the image data-printed medium, and outputs credit income information indicating that the image data-printed medium is authentic in a case where the image data-printed medium is determined to be authentic,
   wherein the management server outputs the credit information without determining whether the image data-printed medium is authentic in a case of receipt of the authentic check information and insertion of the bill in the second currency, and
   wherein the image data-printed medium identification information includes a marker which enables the game controller to recognize that the image data-printed medium has been inserted and initiate processing of the image data-printed medium, and wherein the second output control unit includes the image data-printed medium identification information, which enables the game controller to perform processing identical to processing performed when the image data-printed medium has been inserted, in the pseudo credit image data information when the second type of bill has been inserted.

6. A bill acceptor being capable of reading a ticket printed in a barcode style and first and second-type bills, the bill acceptor configured to:
- convert information on a read ticket to data in a ticket format readable by a game controller of a gaming machine and send the data to the game controller and to a management server, which determines whether operation of the gaming machine is to be permitted;
- send, in a case of reading a first-type bill, first-type bill information to the game controller, which permits operation of a gaming machine; and,
- send, in a case of reading a second-type bill, information on the bill in a form of data converted into the ticket format to the game controller and to the management server, which determines whether operation of the gaming machine is to be permitted.

7. A bill acceptor according to claim 6 further configured to:
- identify, in a case of reading a bill, whether the bill is a domestic bill or a foreign bill;
- convert, in a case where the bill is identified as a domestic bill, information on the bill to data in a domestic bill format readable by the game controller and send the data to the game controller; and
- convert, in a case where the bill is identified as a foreign bill, information on the bill to data in the ticket format readable by the game controller and send the data to the game controller.

8. A control system comprising:
- a game controller of a gaming machine capable of reading data in a domestic bill format read from a domestic bill and data in a ticket format read from a ticket printed in a barcode style;
- a bill acceptor connected with the game controller, for reading a domestic bill and a ticket printed in the barcode style; and
- a conversion device for converting information on a bill other than a domestic bill into data in a ticket format readable by the game controller in a case where the bill acceptor reads a bill other than a domestic bill, the conversion device including:
- a storage device holding conversion data to be used in the conversion process; and
- a conversion control unit; wherein,
- when a domestic bill is inserted into the bill acceptor, the data read from the domestic bill is output to the game controller and operation of the gaming machine is permitted; and wherein,
- when a bill other than a domestic bill is inserted, data is output to the game controller and to a management server, which determines whether operation of the gaming machine is to be permitted.

* * * * *